(12) United States Patent
Shozui et al.

(10) Patent No.: US 7,065,741 B2
(45) Date of Patent: *Jun. 20, 2006

(54) METHOD OF DESIGNING ORGANIZATIONAL INFORMATION PROCESSING AND OPERATIONAL SYSTEM BASED UPON INFORMATION PROVIDERS AND INFORMATION CONSUMERS

(75) Inventors: Mariko Shozui, Musashino (JP); Koshichiro Mitsukuni, Yokohama (JP)

(73) Assignee: Hitachi, LTD, Tokyo (JP)

( * ) Notice: Subject to any disclaimer, the term of this patent is extended or adjusted under 35 U.S.C. 154(b) by 911 days.

This patent is subject to a terminal disclaimer.

(21) Appl. No.: 09/994,956

(22) Filed: Nov. 27, 2001

(65) Prior Publication Data

US 2002/0198754 A1 Dec. 26, 2002

(30) Foreign Application Priority Data

Jun. 26, 2001 (JP) ............................. 2001-192324

(51) Int. Cl.
*G06F 9/44* (2006.01)
(52) U.S. Cl. ....................... 717/104; 717/108
(58) Field of Classification Search ................ 717/104, 717/108
See application file for complete search history.

(56) References Cited

U.S. PATENT DOCUMENTS

| | | | | |
|---|---|---|---|---|
| 5,185,867 A | * | 2/1993 | Ito ............................... | 717/143 |
| 5,353,371 A | * | 10/1994 | Honiden et al. .............. | 706/45 |
| 5,469,539 A | * | 11/1995 | Usuda ......................... | 715/841 |
| 5,487,135 A | * | 1/1996 | Freeman ....................... | 706/59 |
| 5,493,489 A | * | 2/1996 | Tamaki et al. ................. | 705/8 |
| 5,872,973 A | * | 2/1999 | Mitchell et al. ............. | 719/332 |
| 6,199,195 B1 | * | 3/2001 | Goodwin et al. ........... | 717/104 |
| 6,199,198 B1 | * | 3/2001 | Graham ....................... | 717/105 |
| 6,266,806 B1 | * | 7/2001 | Hurd et al. .................. | 717/125 |
| 6,476,814 B1 | * | 11/2002 | Garvey ........................ | 345/440 |
| 6,513,152 B1 | * | 1/2003 | Branson et al. ............. | 717/100 |
| 2002/0198754 A1 | * | 12/2002 | Shozui et al. .................. | 705/7 |

OTHER PUBLICATIONS

Object Engineering Designing Large-Scale Object-Oriented Systems, Gary Sulo, Apr. 1994, pp. 237-303.*
Reuse in SSADM using Object-Orientation, Information Systems Engineering Library, published 1995, pp. 1-174.*
"Object Analysis and Design", Andres, T.F. Hutt, 1994, pp. 177-189.*
An Intermediate Constructor for Application Programming, Daniel P. Friedman et al, ACM, 1980, pp. 245-250.*
A Survey of Structured and Object-Oriented Software Specification Methods and Techniques, Roel Wieringa, ACM Dec. 1998, pp. 459-527.*
Applying Specialization to Process Models, George M. Wyner et al, ACM 1995, pp. 290-301.*
Requirments Rationales: Integrating Approaches to Requirment Analysis, Alistair Sutcliffe, ACM, May 1995, pp. 33-42.*
Modelling Information Flow for IS Development, Dialog DataStar, 1997, 2 pages.*
Rational Rose UML, Booch & OMT Quick Reference, 1996, 10 pages.*

* cited by examiner

*Primary Examiner*—Todd Ingberg
(74) *Attorney, Agent, or Firm*—Knoble Yoshida Dunleavy, LLC

(57) ABSTRACT

The service function and information design process is automated in order to shorten the design process period. The same process is based upon the relationships between activities and the information that the activities provide and consume. The relationships are maintained in a predetermined format and are updated by any changes that are affecting the relationships. In addition, the activities are further defined by detailed activities.

32 Claims, 16 Drawing Sheets

| | 301 | 302 | 303 | 304 | 305 |
|---|---|---|---|---|---|
| | R&D | 001 | | | |
| | ORDER | 002 | PURCHASE | 1 | |
| | | 003 | PURCHASE | 1 | |
| | MANUFACTURE | 004 | | | 1 |
| | INVENTORY | 005 | | | |
| | DISTRIBUTION | 006 | | | |
| | SALES | 007 | | | |
| | INVOICE | 008 | | | |
| | ... | ... | ... | ... | ... |
| | 1ST COLUMN DETAILED ACTIVITY | 2ND COLUMN KEY VALUE | 3RD COLUMN MIDDLE-LEVEL ACTIVITIES | 4TH COLUMN FLAGS | 5TH COLUMN FLAGS |

FIG. 1

| 401 | 402 | 403 |
|---|---|---|
| MANUFACTURE | PURCHASE INSTRUCTIONS | PURCHASE |
| MANUFACTURE | SHIPPING INSTRUCTIONS | INVENTORY |
| MANUFACTURE | DISTRIBUTION INSTRUCTIONS | DISTRIBUTION |
| MANUFACTURE | DELIVERY RESPONSE | SALES |
| MANUFACTURE | MANUFACTURING HISTORY | INVOICE |
| ... | ... | ... |
| 1ST COLUMN INFORMATION PROVIDER | 2ND COLUMN INFORMATION NAME | 3RD COLUMN INFORMATION CONSUMER |

FIG. 3

| 1ST COLUMN INFORMATION PROVIDER ACTIVITY NAME | 2ND COLUMN INFORMATION NAME | 3RD COLUMN INFORMATION CONSUME ACTIVITY NAME | 4TH COLUMN SYSTEMATIZATION FACTORS | 5TH COLUMN ACTIVITY CONTENTS | 6TH COLUMN SUBJECT |
|---|---|---|---|---|---|
| MANUFACTURE | SHIPPING INSTRUCTIONS | INVENTORY | | | |
| MANUFACTURE | DISTRIBUTION INSTRUCTIONS | DISTRIBUTION | | | |
| MANUFACTURE | DELIVERY RESPONSE | SALES | | | |
| MANUFACTURE | MANUFACTURING HISTORY | INVOICE | | | |
| ... | ... | ... | ... | ... | ... |

| 1ST ROW INFORMATION NAME | 2ND ROW INFORMATION PROVIDER ACTIVITY NAME | 3RD ROW INFORMATION CONSUME ACTIVITY NAME | 4TH ROW SYSTEMATIZATION FACTORS | 5TH ROW KEY ITEMS | 6TH ROW INPUT ITEMS |
|---|---|---|---|---|---|
| SHIPPING INSTRUCTIONS | MANUFACTURE | INVENTORY | | | |
| DISTRIBUTION INSTRUCTIONS | MANUFACTURE | DISTRIBUTION | | | |
| DELIVERY RESPONSE | MANUFACTURE | SALES | | | |
| MANUFACTURING HISTORY | MANUFACTURE | INVOICE | | | |
| ... | ... | ... | ... | ... | ... |

FIG. 6

801 ROW COUNTER BOX: 5

802 ACTIVITY NAME ROW: R&D | PURCHASE | MANUFACTURE | INVENTORY | DISTRIBUTION | SALES | INVOICE

803 EVENT RECORD COLUMN: SALES, ORDER HISTORY, MANUFACTURE, DELIVERY RESPONSE, SALES

Entries shown: DELIVERY RESPONSE (under MANUFACTURE), ORDER HISTORY (under SALES)

FIG. 7

METHOD OF DESIGNING ORGANIZATIONAL INFORMATION PROCESSING AND OPERATIONAL SYSTEM BASED UPON INFORMATION PROVIDERS AND INFORMATION CONSUMERS

FIELD OF THE INVENTION

The current invention is generally related to organizational information processing methods and systems, and more particularly related to standardization and automation in designing a new service operation.

BACKGROUND OF THE INVENTION

In response to globally competitive and ever-changing business environment, many new businesses are now reorganizing their information systems that are highly tied to operational strategies. The information systems generally function as a foundation for the operation and is demanded for large-scale, high-speed and complex operations. In addition to the above requirements, it is also strongly demanded that the information systems be designed and made ready for use in a short period of time in the above described highly competitive age. Designing the information systems tends to be highly labor intensive and inefficient in the conventional art. To improve the information system design process, templates have been used in a limited capacity. For the above reason, it is highly desirable to improve the process of designing information systems.

SUMMARY OF THE INVENTION

In order to solve the above and other problems, according to a first aspect of the current invention, a method of designing an information flow process, including the steps of: determining a predetermined set of activity names in a predetermined sequence, the activity names respectively representing certain service operations; displaying the activity names as information provider activity names and information consumer activity names according to the predetermined sequence in a predetermined data flow definition (DFD) matrix format; specifying an information name, one of the information provider activity names and a corresponding one of the information consumer activity names, the information name at a position in the predetermined DFD matrix format representing data to be transmitted from the information provider activity name to the information consumer activity name; and storing the relations among the information provider activity names, the information names and the information consumer activity names in an entity relation (ER) source information file.

According to a second aspect of the current invention, a medium storing a computer program for designing an information flow process, the computer program performing the tasks of: determining a predetermined set of activity names in a predetermined sequence, the activity names respectively representing certain service operations; displaying the activity names as information provider activity names and information consumer activity names according to the predetermined sequence in a predetermined data flow definition (DFD) matrix format; specifying an information name, one of the information provider activity names and a corresponding one of the information consumer activity names, the information name at a position in the predetermined DFD matrix format representing data to be transmitted from the information provider activity name to the information consumer activity name; and storing the relations among the information provider activity names, the information names and the information consumer activity names in an entity relation (ER) source information file.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a table illustrating an exemplary activity name table to be used in a preferred process of defining information flows that are associated with operational activities according to the current invention.

FIG. 3 is a table illustrating an exemplary entity relation (ER) source information table to be used in the preferred process of defining information flows that are associated with operational activities according to the current invention.

FIG. 5 is a diagram illustrating an exemplary new service function design table to be used in the preferred process of defining information flows that are associated with operational activities according to the current invention.

FIG. 6 is a diagram illustrating an exemplary service information design table to be used in the preferred process of defining information flows that are associated with operational activities according to the current invention.

FIG. 7 is an exemplary event trace diagram illustrating events in the preferred process of defining information flows that are associated with operational activities according to the current invention.

DETAILED DESCRIPTION OF THE PREFERRED EMBODIMENT(S)

Figure 2:
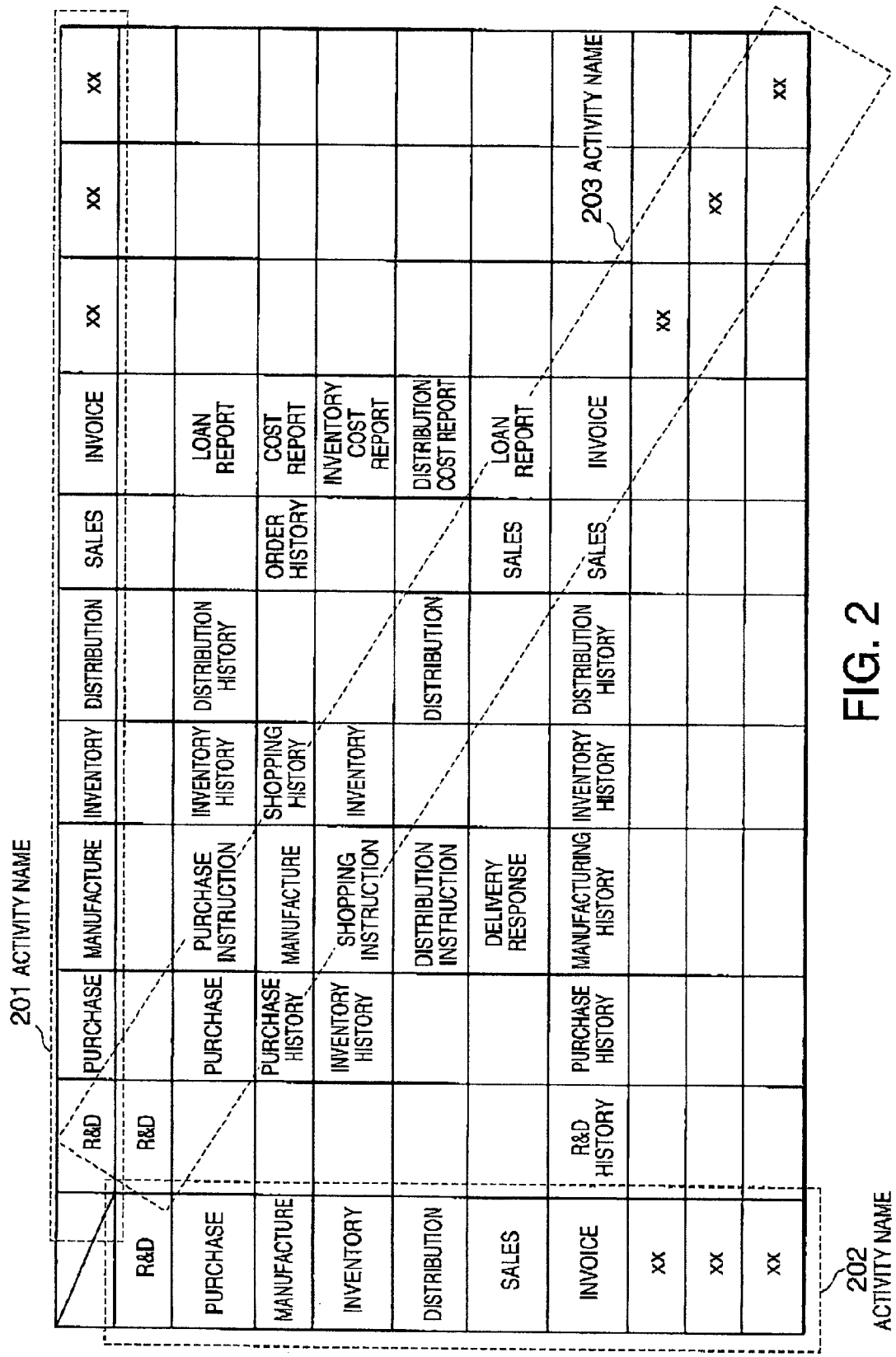
FIG. 2 is a table illustrating an exemplary data flow definition (DFD) matrix to be used in the preferred process of defining information flows that are associated with operational activities according to the current invention.

Referring now to the drawings, wherein like reference numerals designate corresponding structures throughout the views, and referring in particular to FIG. 1, a table illustrates an exemplary activity name table to be used in a preferred process of defining information flows that are associated with operational activities according to the current invention. The exemplary table maintains activity names for the activities to be performed by an information provider or an information consumer. A first column 301 contains the most detailed activities while a second column 302 contains a corresponding key value. A third column 303 contains mid-level activities that are parent to the detailed activities in the first column 301. A forth column 304 contains flags for indicating the mid-level activities for a data flow definition matrix. A fifth column 305 contains flags for indicating a structure data flow.

FIG. 2, a table illustrates an exemplary data flow definition (DFD) matrix to be used in the preferred process of defining information flows that are associated with operational activities according to the current invention. The exemplary DFD matrix is used to define activities such as activities within an information provider and an information consumer as well as information flows between the information provider and the information consumer. The DFD matrix includes an activity name row 201 in a horizontal direction, an activity name column 202 in a vertical direction and an activity name diagonal 203. The activity name row 201 maintains from the left to the right the activity names that are stored in the activity name table of FIG. 1 in an ascending manner according to the key values in the second column 302. Similarly, the activity name column 202 maintains from the top to the bottom the activity names that are stored in the activity name table of FIG. 1 in an ascending manner according to the key values in the second column 302. The activity name diagonal 203 maintains from the top left to the bottom right the activity names that are stored in the activity name table of FIG. 1 in an ascending manner according to the key values in the second column 302. The blank cells in the DFD maintain information names for information that is transmitted between the activity names.

Referring to FIG. 3, a table illustrates an exemplary entity relation (ER) source information table to be used in the preferred process of defining information flows that are associated with operational activities according to the current invention. A first column 401 maintains activity names for the information provider. A second column 402 maintains information names for the information that the information provider provides. A third column 403 maintains activity names for the information consumer.

Figure 4:
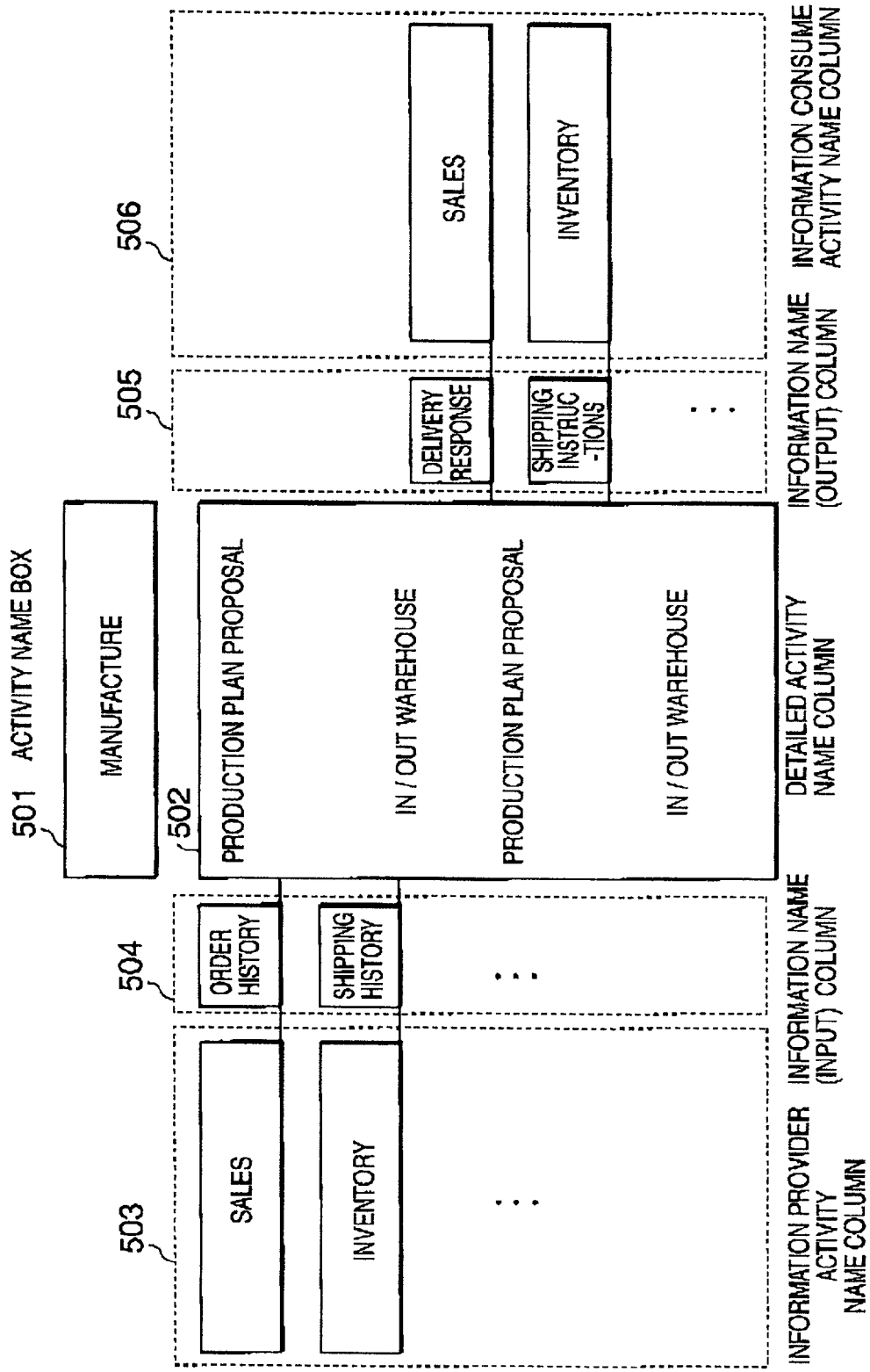
FIG. 4 is a diagram illustrating an exemplary structure data flow chart or input screen to be used in the preferred process of defining information flows that are associated with operational activities according to the current invention.

Referring to FIG. 4, a diagram illustrates an exemplary structure data flow chart or input screen to be used in the preferred process of defining information flows that are associated with operational activities according to the current invention. An activity name box 501 contains an exemplary activity name, "MANUFACTURE" that is to be detailed. The detail activity name box 502 contains detailed activity names with respect to input information 503, 504 as well as output information 505, 506. The information provider activity name box 503 contains activity names whose activity provide input information to the detail activity name as stored in the activity name box 501. An input information name box 504 contains information that is provided by the corresponding activity whose activity name is adjacently placed in the information provider activity name box 503. For the detail activity name as stored in the activity name box 501, an output information name box 505 contains information that is used by the corresponding activity whose activity name is adjacently placed in an information consumer activity name box 506. The information consumer activity name box 506 contains activity names for a common information consumer, and the activities as specified by the activity names in the information consumer activity name box 506 consume the output information.

Referring to FIG. 5, a diagram illustrates an exemplary new service function design table to be used in the preferred process of defining information flows that are associated with operational activities according to the current invention. In general, the new service function design table stores information on service function designs and new function descriptions. A first column 601 maintains activity names that provide a corresponding information name. A second column 602 maintains information that the above source activity name in the first column 601 provides. A third column 603 maintains the activity names that consume the information stored in the second column 602. A fourth column 604 maintains functional systematization factors for the activity names in the first column 601 that provide the information in the second column 602 which in turn is consumed by the activity names in the third column 603. A fifth column 605 maintains activity contents for the activity names in the first column 601 that provide the information in the second column 602 which in turn is consumed by the activity names in the third column 603. Lastly, a sixth column 606 maintains subjects for implementing the systematization factors in the fourth column 604.

Referring to FIG. 6, a diagram illustrates an exemplary service information design table to be used in the preferred process of defining information flows that are associated with operational activities according to the current invention. A first column 701 maintains information names. A second column 702 maintains activity names that provide information that is stored in the first column 701. A third column 703 maintains activity names that consume the information stored in the first column 701. A fourth column 704 maintains informational systematization factors for the information names in the first column 701 that is provided by the information provider activity names in the fifth column 702 and that is consumed by the activity names in the third column 703. A fifth column 705 maintains key items for implementing the informational systematization factors in the fourth column 704. Lastly, a sixth column 706 maintains input items for implementing the informational systematization factors in the fourth column 704.

Referring to FIG. 7, an exemplary event trace diagram illustrates events in the preferred process of defining information flows that are associated with operational activities according to the current invention. The event trace sequentially expresses operational activities and informational flows based upon the service operation. A row counter box 801 stores a number of rows in an event record column 803 for a current process. The activity name row 802 maintains from the left to the right the activity names that are stored in the activity name table of FIG. 1 in an ascending manner according to the key values in the second column 302. The event record column 803 alternatively maintains the activity names and the information names from the event trace table.

Figure 8:
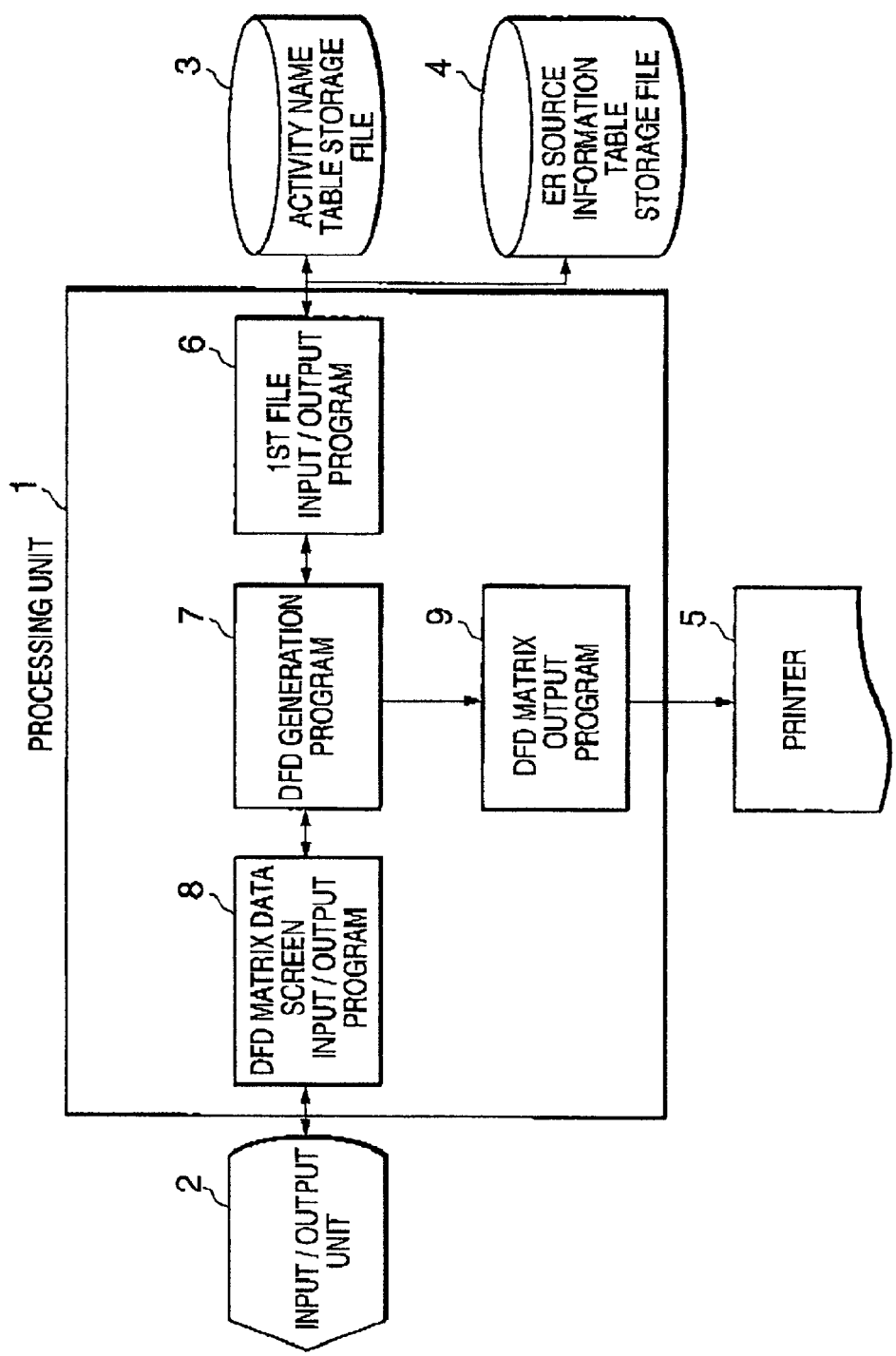
FIG. 8 is a block diagram illustrating a first preferred embodiment of the processing unit according to the current invention.

Now referring to FIG. 8, a block diagram illustrates a first preferred embodiment of the processing unit according to the current invention. The processing unit 1 is connected to an input/output unit 2 and a printer 5. The processing unit 1 has access to an activity name table storage file 3 and an entity relation (ER) source information table storage file 4. The processing unit 1 executes a first file input/output program 6 for accessing the activity name table storage file 3, which stores the activity name table as shown in FIG. 1 and the ER source information table storage file 4, which stores the ER source information table as shown in FIG. 3. The processing unit 1 executes a data flow definition (DFD) matrix data screen input/output program 8 for inputting and outputting data via the input/output unit 2 to and from the processing unit 1. The input/output unit 2 displays DFD matrix data or receives the data for a DFD matrix. Based upon the information from the activity name table storage file 3 and the ER source information table storage file 4 via the first file input/output program 6, the processing unit 1 executes a DFD generation program 7 for generating a DFD matrix as shown in FIG. 2 and for outputting the generated DFD matrix to a DFD matrix output program 9. The DFD matrix data screen input/output program 8 receives the generated DFD matrix from the DFD generation program 7 and outputs to the input/output unit 2. The DFD matrix data screen input/output program 8 and the DFD generation program 7 receive some input data from the input/output unit 2 and place the data at a corresponding position in the generated DFD matrix. Finally, the processing unit 1 executes the DFD matrix output program 9 for outputting the DFD matrix to the printer 5.

Figure 9:
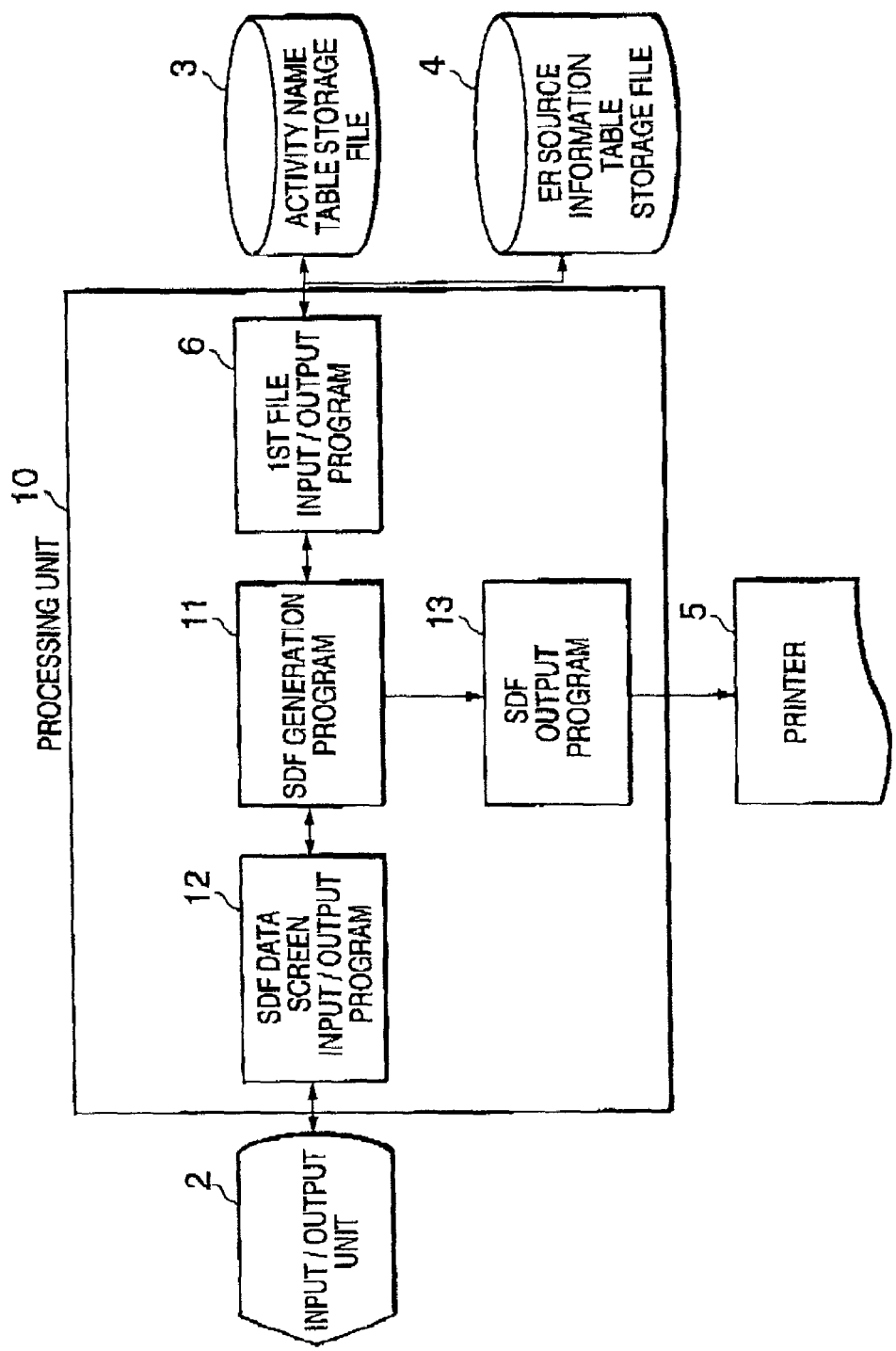
FIG. 9 is a block diagram illustrating a second preferred embodiment of the processing unit according to the current invention.

Now referring to FIG. 9, a block diagram illustrates a second preferred embodiment of the processing unit according to the current invention. The processing unit 10 is connected to an input/output unit 2 and a printer 5. The processing unit 10 has access to the activity name table storage file 3 and the entity relation (ER) source information table storage file 4. The processing unit 10 executes the first file input/output program 6 for accessing the activity name table storage file 3, which stores the activity name table as shown in FIG. 1 and the ER source information table storage file 4, which stores the ER source information table as shown in FIG. 3. The processing unit 10 executes a structured data flow (SDF) data screen input/output program 12 for inputting and outputting data via the input/output unit 2 to and from the processing unit 10. The input/output unit 2 displays SDF data or receives the data for a SDF chart. Based upon the information from the activity name table storage file 3 and the ER source information table storage file 4 via the first file input/output program 6, the processing unit 10 executes a SDF generation program 11 for generating a SDF chart as shown in FIG. 4 and for outputting the generated SDF chart to a SDF output program 13. The DFD matrix data screen input/output program 8 receives the generated DFD matrix from the SFD generation program 11 and outputs to the input/output unit 2. The SDF data screen input/output program 12 and the SDF generation program 11 receive some input data from the input/output unit 2 and place the data at a corresponding position in the generated SDF chart. Finally, the processing unit 10 executes the SDF output program 13 for outputting the SDF chart to the printer 5.

Figure 10:
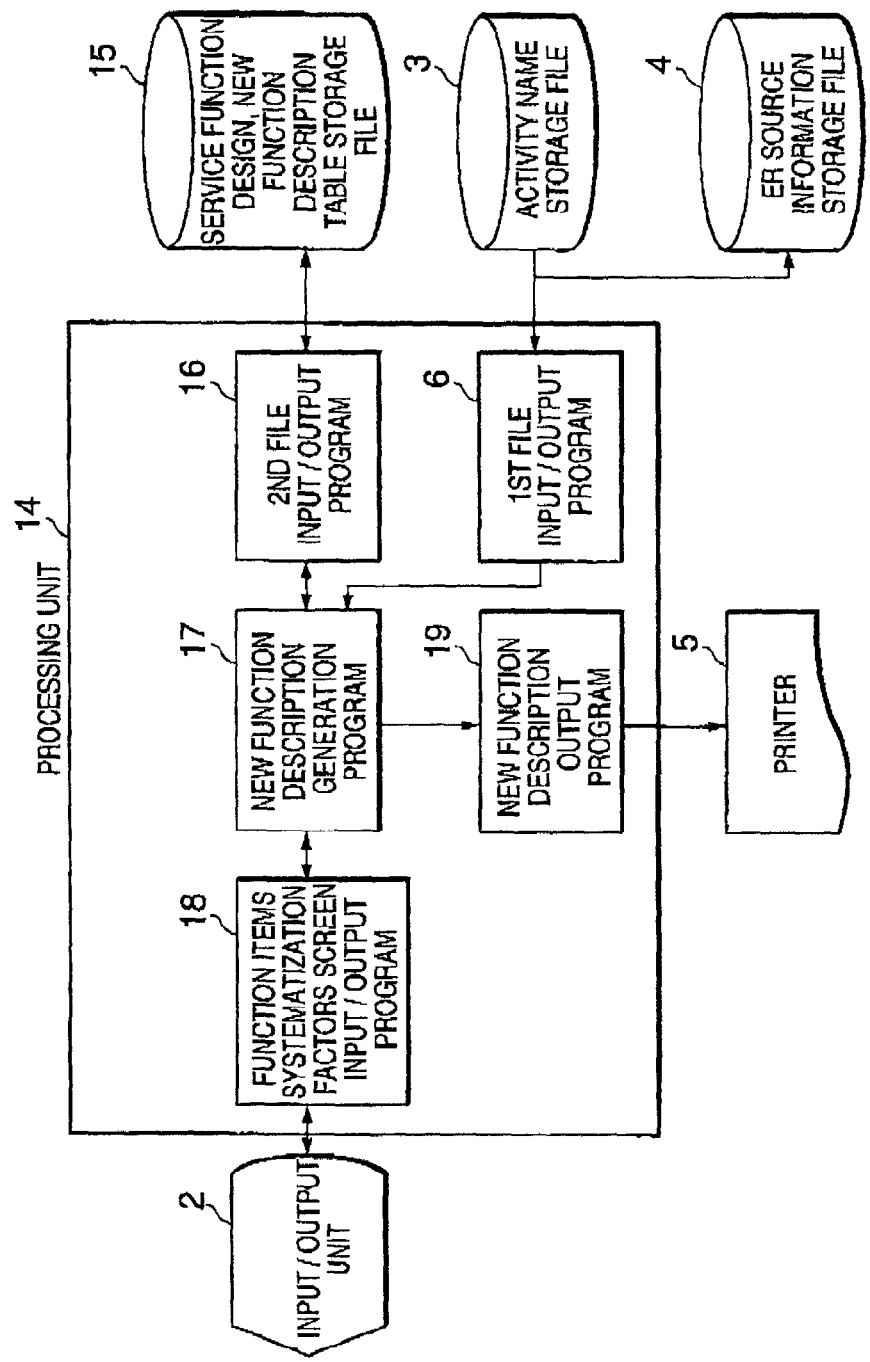
FIG. 10 is a block diagram illustrating a third preferred embodiment of the processing unit according to the current invention.

Now referring to FIG. 10, a block diagram illustrates a third preferred embodiment of the processing unit according to the current invention. The processing unit 14 is connected to an input/output unit 2 and a printer 5. The processing unit 14 has access to the activity name table storage file 3, the entity relation (ER) source information table storage file 4 as well as a service function design/new function description table storage file 15. The processing unit 14 executes the first file input/output program 6 for accessing the activity name table storage file 3, which stores the activity name table as shown in FIG. 1 and the ER source information table storage file 4, which stores the ER source information table as shown in FIG. 3. The processing unit 14 executes a second file input/output program 16 for accessing the activity name table storage file 15, which stores the new service function design table as shown in FIG. 5. The processing unit 14 executes a function items systematization factors screen input/output program 18 for inputting and outputting data via the input/output unit 2 to and from the processing unit 14. The input/output unit 2 displays data or receives the data for new function description. Based upon the information from the activity name table storage file 3 and the ER source information table storage file 4 via the first file input/output program 6 as well as from the activity name table storage file 15 via the second file input/output program 16, the processing unit 14 executes a new function description generation program 17 for generating the new function description and for outputting the generated new function description to a new function description output program 19. The function items systematization factors screen input/output program 18 receives the generated new function description from the new function description generation program 17 and outputs the new function description to the input/output unit 2. The function items systematization factors screen input/output program 18 and the new function description generation program 17 receive some input data from the input/output unit 2 and place the data at a corresponding position in the new function description. Finally, the processing unit 14 executes the new function description output program 19 for outputting the new function description to the printer 5.

Figure 11:
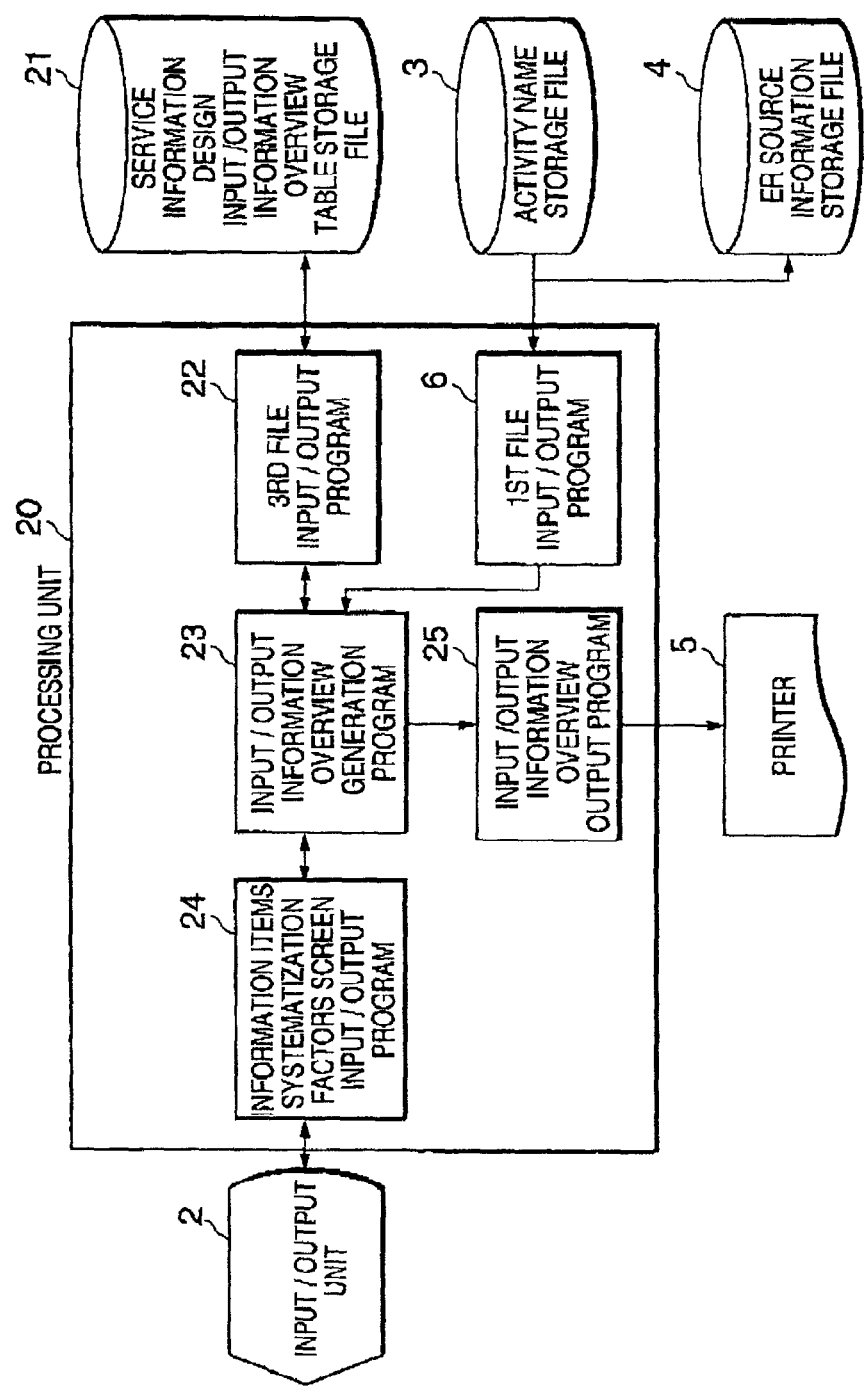
FIG. 11 is a block diagram illustrating a fourth preferred embodiment of the processing unit according to the current invention.

Now referring to FIG. 11, a block diagram illustrates a fourth preferred embodiment of the processing unit according to the current invention. The processing unit 20 is connected to an input/output unit 2 and a printer 5. The processing unit 20 has access to the activity name table storage file 3, the entity relation (ER) source information table storage file 4 as well as a service information design input/output information overview table storage file 21. The processing unit 20 executes the first file input/output program 6 for accessing the activity name table storage file 3, which stores the activity name table as shown in FIG. 1 and the ER source information table storage file 4, which stores the ER source information table as shown in FIG. 3. The processing unit 20 executes a third file input/output program 22 for accessing the service information design input/output information overview table storage file 21, which stores the service information design table as shown in FIG. 6 and an input/output information overview table. The processing unit 20 executes an information items systematization screen input/output program 24 for inputting and outputting data via the input/output unit 2 to and from the processing unit 20. The input/output unit 2 displays data or receives the data for the input/output information overview. Based upon the information from the activity name table storage file 3 and the ER source information table storage file 4 via the first file input/output program 6 as well as from the service information design input/output information overview table storage file 21 via the third file input/output program 22, the processing unit 20 executes an input/output information generation program 23 for generating the input/output information overview and for outputting the generated input/output information overview to an input/output information overview output program 25. The information items systematization factor screen input/output program 24 receives the generated input/output information overview from the input/output information overview generation program 23 and outputs the input/output information overview to the input/output unit 2. The information items systematization factor screen input/output program 24 and the input/output information overview generation program 23 receive some input data from the input/output unit 2 and place the data at a corresponding position in the input/output information overview. Finally, the processing unit 20 executes the input/output information overview output program 25 for outputting the input/output information overview to the printer 5.

Figure 12:
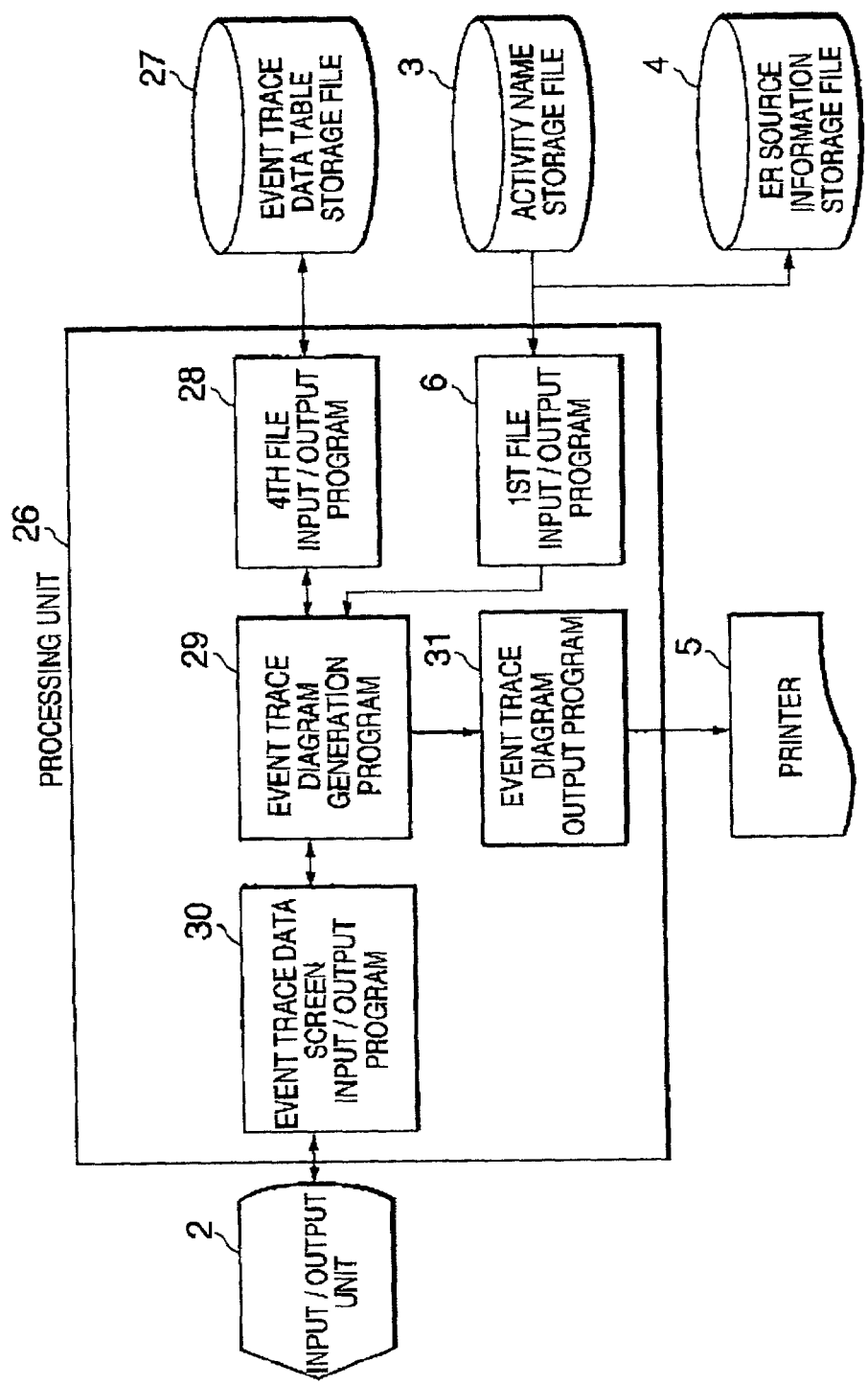
FIG. 12 is a block diagram illustrating a fifth preferred embodiment of the processing unit according to the current invention.

Now referring to FIG. 12, a block diagram illustrates a fifth preferred embodiment of the processing unit according to the current invention. The processing unit 26 is connected to an input/output unit 2 and a printer 5. The processing unit 26 has access to the activity name table storage file 3, the entity relation (ER) source information table storage file 4 as well as an event trace data table storage file 27. The processing unit 26 executes the first file input/output program 6 for accessing the activity name table storage file 3, which stores the activity name table as shown in FIG. 1 and the ER source information table storage file 4, which stores the ER source information table as shown in FIG. 3. The processing unit 26 executes a fourth file input/output program 28 for accessing the event trace data table storage file 27, which stores event trace data. The processing unit 26 executes an event trace data screen input/output program 30 for inputting and outputting data via the input/output unit 2 to and from the processing unit 26. The input/output unit 2 displays data or receives the data for a correspond DFD matrix.

Based upon the information from the activity name table storage file 3 and the ER source information table storage file 4 via the first file input/output program 6 as well as from the event trace data table storage file 27 via the fourth file input/output program 28, the processing unit 26 executes an event trace diagram generation program 29 for generating the event trace diagram and for outputting the generated event trace diagram to an event trace diagram output program 31. The event trace data screen input/output program 30 receives the generated event trace diagram from the event trace diagram generation program 29 and outputs the event trace diagram to the input/output unit 2. The event trace data screen input/output program 30 and the event trace diagram generation program 29 receive some input data from the input/output unit 2 and place the data in the event trace table. Finally, the processing unit 26 executes the event trace diagram output program 31 for outputting the event trace diagram to the printer 5.

Figure 13:
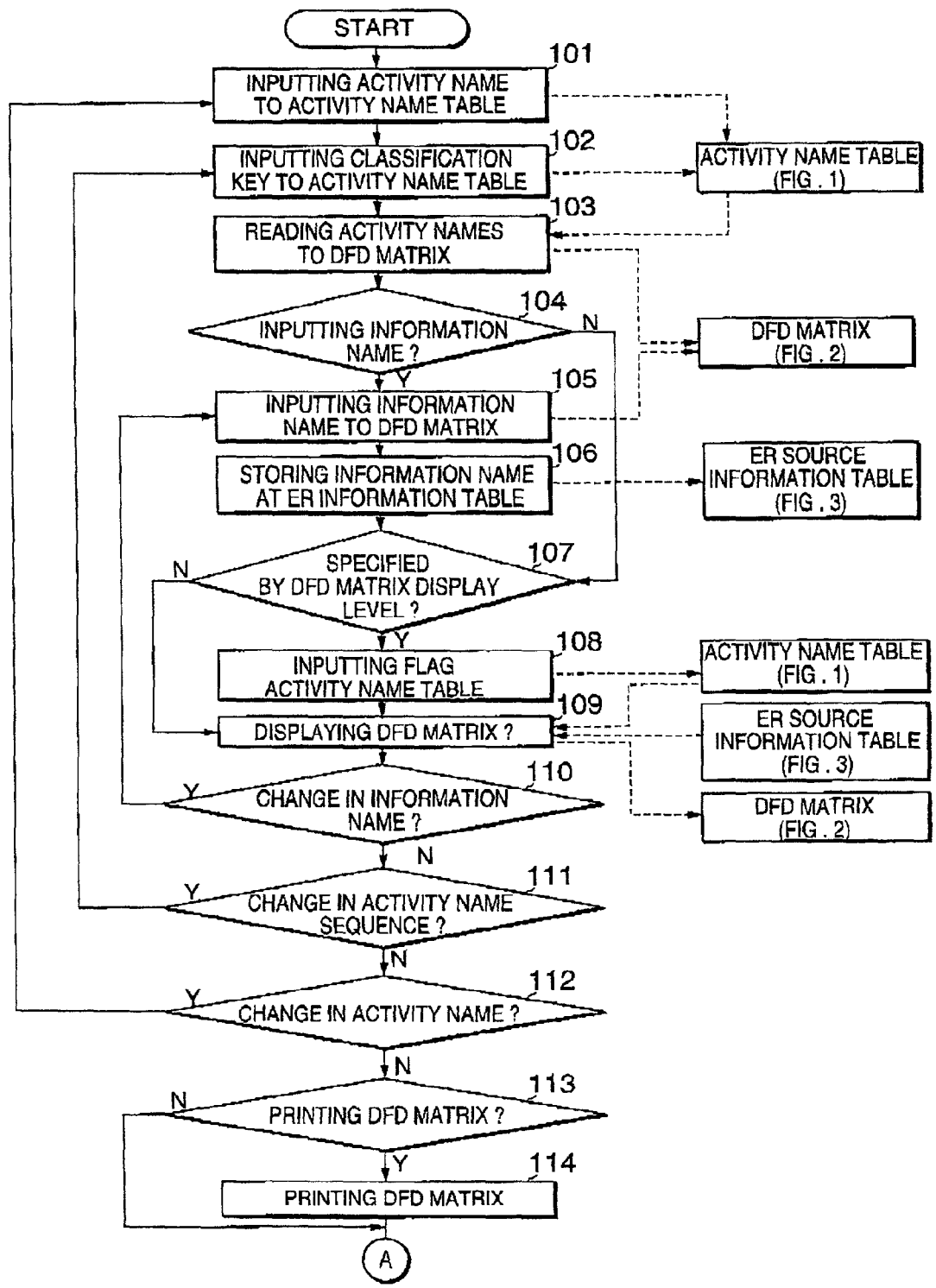
FIG. 13 is a flow chart illustrating steps involved in the preferred process of defining information flows that are associated with operational activities according to the current invention.

Referring to FIG. 13, a flow chart illustrates steps involved in the preferred process of defining information flows that are associated with operational activities according to the current invention. In particular, the steps are performed by the DFD generation program 7. Via the input/output unit 2, an activity name is inputted into the first column 301 of the activity name table as shown in FIG. 1 and is stored in the activity name table storage file 3 in a step 101. Subsequently, a classification key that indicates an activity name order is inputted into the second column 302 of the activity name table in a step 102. In a step 103, the above stored activity name is read into a blank DFD matrix from the first column 301 in the activity name table in the activity name table storage file 3. The reading sequence is according to the ascending order of the classification key in the second column 302 of the activity name table as shown in FIG. 1. For a horizontal axis, the reading sequence of the activity names is from the left to the right. For a vertical axis, the reading sequence of the activity names is from the top to the bottom. For a diagonal direction, the reading sequence of the activity names is from the top left to the bottom right where the same activity names cross from horizontal and vertical axes. In a step 104, it is confirmed with a user whether or not information names are inputted in the DFD matrix. If there is no need to input the information names, the preferred process proceeds to a step 107. On the other hand, if the information names are to be inputted, in a step 105, the information name that is consumed by the activity name on the vertical axis and that is provided by the activity name on the horizontal axis is placed via the input/output unit 2 in a corresponding cell or position where the above activity names cross in the DFD matrix.

Still referring to FIG. 13, the information provider activity name, the corresponding information name and the information consumer are stored respectively in the first column 401, the second column 402 and the third column 403 in the entity relation (ER) source information table as shown in FIG. 3 in a step 106. In a step 107, it is confirmed with the user whether or not there is a level specification for the activity name to be displayed in the DFD matrix. When a level is specified and the specified level is the mid-level, a flag is inserted in the fourth column 304 of the activity name table as shown in FIG. 1 in a step 108. On the other hand, when there is no level specification, the preferred process proceeds to a step 109, where the detailed activity names in the first column 301 of the activity name table as shown in FIG. 1 are used to display in the DFD matrix as shown in FIG. 2. In the step 109, when the level specification flag in the third column 304 is "1," the mid-level activity names are used to display in the DFD matrix. In other words, depending upon the flag in the fourth column 304 of the activity name table, either the activity name in the first column 301 or the activity name in the third column 303 is displayed in the DFD matrix.

Subsequently, a series of questions is asked to the user. In a step 110, it is confirmed with the user whether or not there is a change in the information name or the position. If there is a change, the preferred process goes back the step 105. On the other hand, if there is no change, it is further confirmed with the user whether or not there is a change in the activity name sequence in a step 111. If there is a change, the preferred process goes back the step 102. On the other hand, if there is no change, it is further confirmed with the user whether or not there is a change in the activity name sequence in a step 111. If there is a change, the preferred process goes back the step 102 for changing the classification key according to the modified sequence. On the other hand, if there is no change, it is further confirmed with the user whether or not there is a change in the activity name in a step 112. If there is a change, the preferred process goes back the step 101 for inputting the activity name change. On the other hand, if there is no change, the user is asked whether or not she wishes to print the DFD matrix in a step 113. If printing is desired, the DFD matrix as shown in FIG. 2 is printed via the printer 5 in a step 114. If no printing is desired, the preferred process bypasses the step 114.

Figure 14:
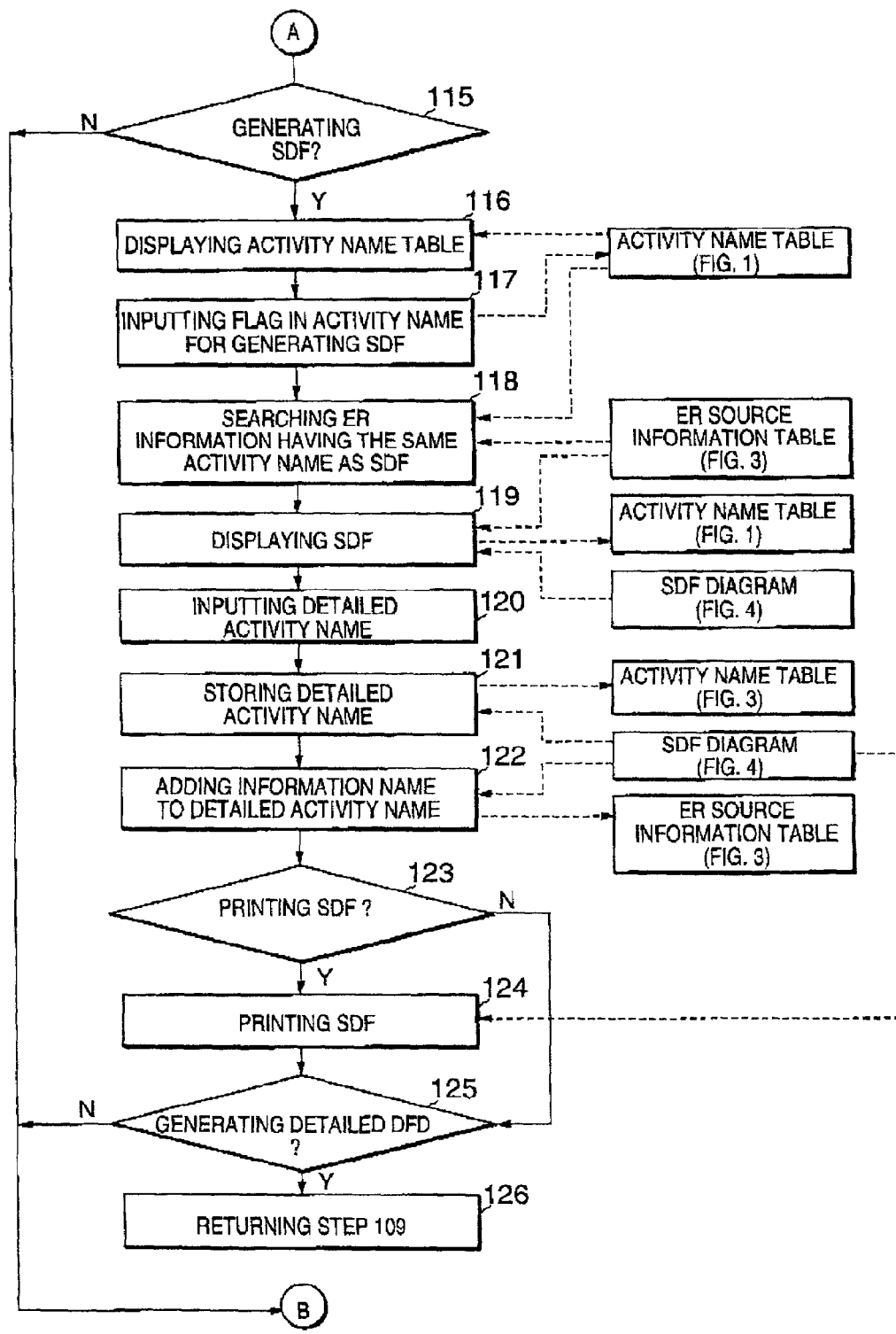
FIG. 14 is a flow chart illustrating further steps involved in the preferred process of defining information flows that are associated with operational activities according to the current invention.

Referring to FIG. 14, a flow chart illustrates further steps involved in the preferred process of defining information flows that are associated with operational activities according to the current invention. In particular, the steps are performed by the SDF generation program 11. The following steps are either independent from or continuous with the previous steps as shown in FIG. 13. The user is asked whether or not she wishes to generate the SDF in a step 115. If the user specifies that SDF is not generated, the preferred process skips steps 116 through 126 and potentially continues to a step 127 in FIG. 15. On the other hand, if the user selects to generate SDF, the activity name table is read in from the activity name table storage file 3 in a step 116. In the activity name table, another flag is indicated in the fifth column 305 for the corresponding activity name in the first column 301 to be used for generating SDF in a step 117. The activity name as indicated by the flag in the fifth column 305 is searched in the ER source information table in the ER source information table storage file 4 in a step 118.

In a step 119, the above flagged activity name is placed in the activity box 501. If the above flagged activity name is in the first column 401 in the ER source information table, the above flagged activity name is an information provider. Because of the information provider status, the information name in the second column 402 in the ER source information table is outputted to the output information name box 505 in the SDF chart as shown in FIG. 4. Similarly, the information consumer activity name in the third column 403 in the ER source information table is outputted to the information consumer box 506 in the SDF chart as shown in FIG. 4. On the other hand, if the above flagged activity name is in the third column 403 in the ER source information table, the above flagged activity name is an information consumer. Because of the information consumer status, the information name in the second column 402 in the ER source information table is outputted to the input information name box 504 in the SDF chart as shown in FIG. 4. The information provider activity name corresponding to the activity name in the first column 401 in the ER source information table is placed in the information provider activity name box 503. Finally, the SDF chart is generated and is outputted to the input/output unit 2 in the step 119.

Still referring to FIG. 14, in a step 120, the activity name as displayed in the activity name box 501 in the above generated SDF chart is further detailed by inputting the corresponding detailed activity names in the detailed activity name column 502. The detailed activity name includes the input information corresponding to the information provider activity name box 503 and the input information name box 504 and the output information corresponding to the information consumer activity name box 5036 and the output information name box 505. In a step 121, the activity name in the first column 301 in the activity name table that corresponds to the activity name in the activity name box 501 in the SDF chart is replaced by one or more of the detailed activity names that are placed in the detailed activity name box 502 in the SDF chart. Prior to the above replacement, the above activity names are copied in the corresponding third column 303 of the activity name table as shown in FIG. 3. In a step 122, based upon the corresponding relation between the information name in the input information name box 504 in the SDF chart and the information name in the second column 402 in the ER source information table, the information consumer activity name in the third column 403 of the ER source information table is changed to the detailed activity name in the detailed activity name box 502 of the SDF chart. Similarly, in the step 122, based upon the corresponding relation between the information name in the output information name box 505 in the SDF chart and the information name in the second column 402 in the ER source information table, the information provider activity name in the first column 401 of the ER source information table is changed to the detailed activity name in the detailed activity name box 502 of the SDF chart. Thus, the ER source information table has been updated in the step 122. It is confirmed with the user whether or not the SDF chart is to be printed in a step 123. If it is desired for printing, the SDF chart as shown in FIG. 5 is outputted to the printer 5 in a step 124. Subsequent to the step 124 or if no printing is desired in the step 123, it is further confirmed with the use whether or not a detailed DFD matrix is to be generated based upon the detailed activity names in a step 125. If the detailed DFD matrix is to be generated, the preferred process returns to the step 109 via a step 126. On the other hand, if the detailed DFD matrix is not to be generated, the preferred process proceeds to a step 127 in FIG. 15 as indicated by the letter B.

Figure 15:
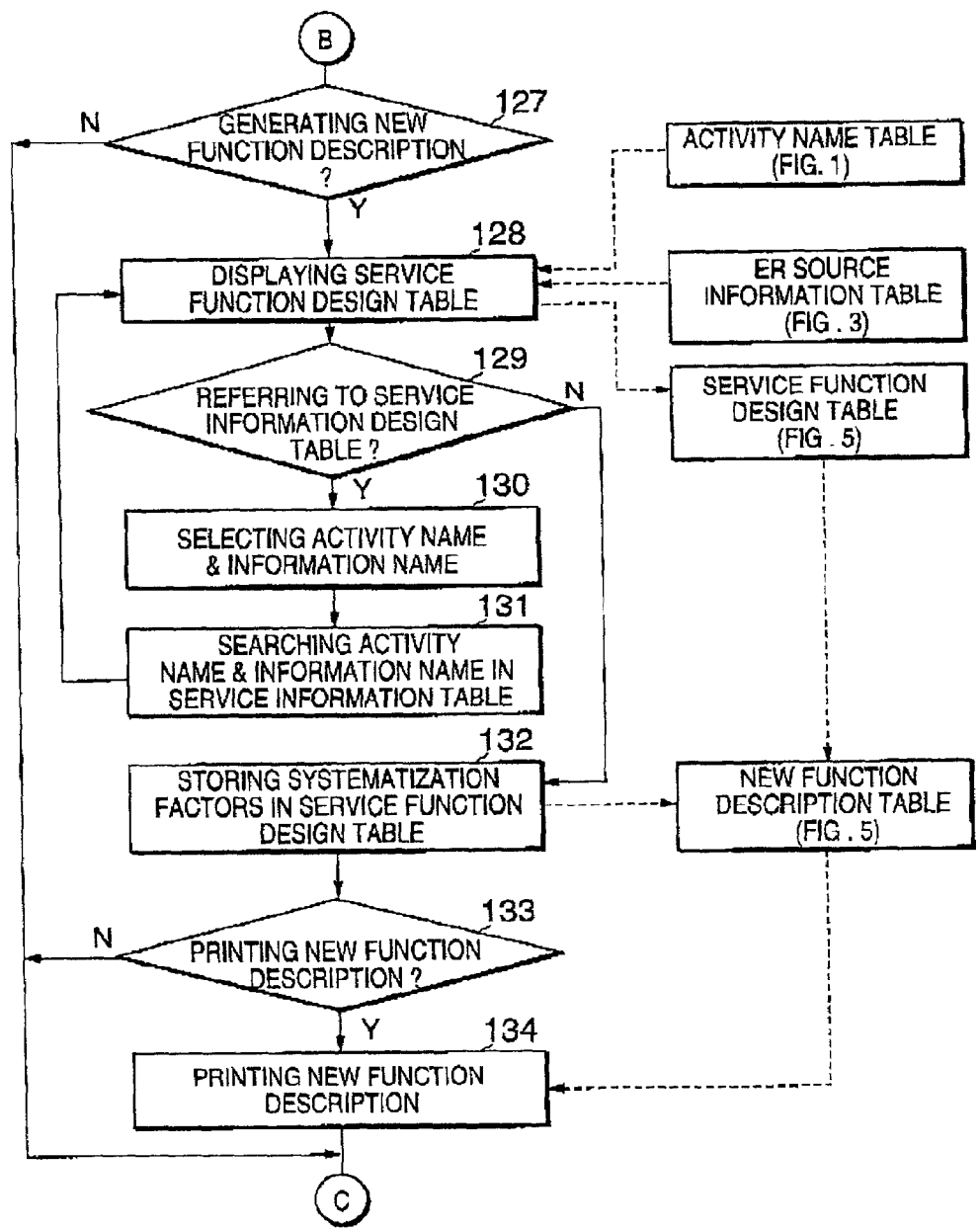
FIG. 15 is a flow chart illustrating further steps involved in the preferred process of defining information flows that are associated with operational activities according to the current invention.
Figure 16:
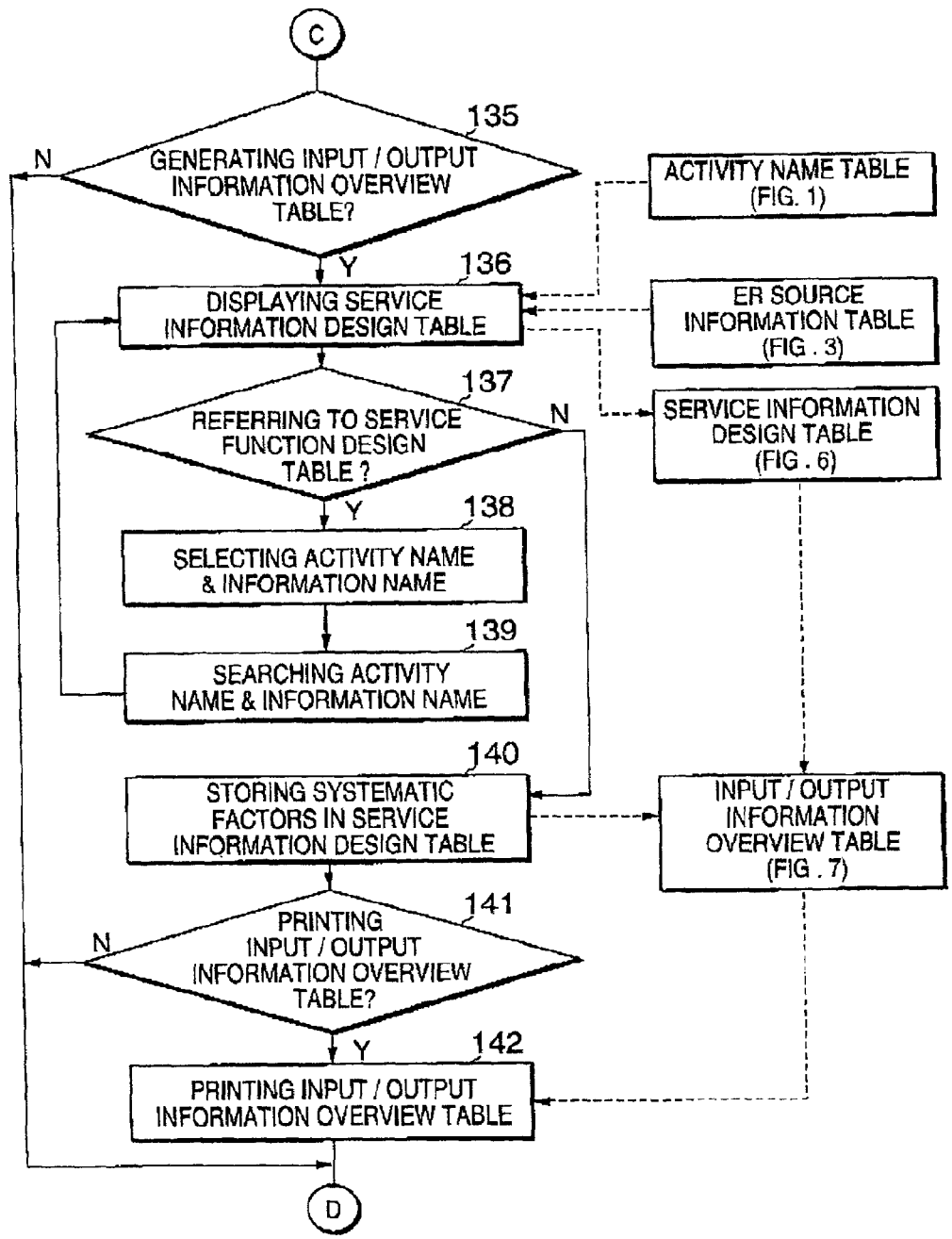
FIG. 16 is a flow chart illustrating further steps involved in the preferred process of defining information flows that are associated with operational activities according to the current invention.

Referring to FIG. 15, a flow chart illustrates further steps involved in the preferred process of defining information flows that are associated with operational activities according to the current invention. In particular, the steps are performed by the new function description generation program 17. The following steps are either independent from or continuous with the previous steps as shown in FIG. 14. In a step 127, it is confirmed with the user whether or not new function description is to be generated. If the new function description is not generated, the preferred process skips steps 127 through 134 to proceed to a step 135 as shown in FIG. 16. On the other hand, if the new function description is generated, the information provider activity name in the first column 401, the information name in the second column 402 and the information consumer activity name in the third column 403 of the ER source information table are respectively copied into the first column 601, the second column 602 and the third column 603 of the new service function table in the service function design/new function description table storage file 15 and are outputted to the input/output unit 2 in a step 128. In the above duplication, the information for the activity names in the first column 601 in the new service function table is placed in the vertical direction according to the sequence as indicated by the classification key in the second column 302 of the activity name table in the step 128.

Still referring to FIG. 15, in a step 129, it is confirmed with the user whether or not the user refers to the service information design table as shown in FIG. 6. If the service information design table does not yet exist or the user does not wish to refer to it, the preferred process proceeds to a step 132. On the other hand, if the service information design table is to be referred, a combination of the first, second and third columns 601, 602, 603 is selected in a step 130. The selected combination is searched in the first, second and third columns 701, 702, 703 in the service information design table, and the searched results are displayed in a step 131. The above reference on the information allows the user to consider functional systematization factors. Subsequently, the preferred process returns to the step 128, where the service function design table is again displayed and to the step 129, where the user is asked whether or not the service information design table needs to be referred. If there is no need for the reference, in a step 132, the input/output unit 2 reads the systematization factors, the activity contents and the subject from the fourth, fifth and sixth columns 604, 605 and 606 of the service function table and stores them in a new function description table in the service information design input/output information overview table storage file 21. In a step 133, the user is asked whether or not the new function description is to be printed. If the new function description is to be printed, the new function description is outputted to the printer 5 in a step 134. On the other hand, if the new function description is not printed, the preferred process proceeds to the step 135 as shown in FIG. 16.

Figure 17:
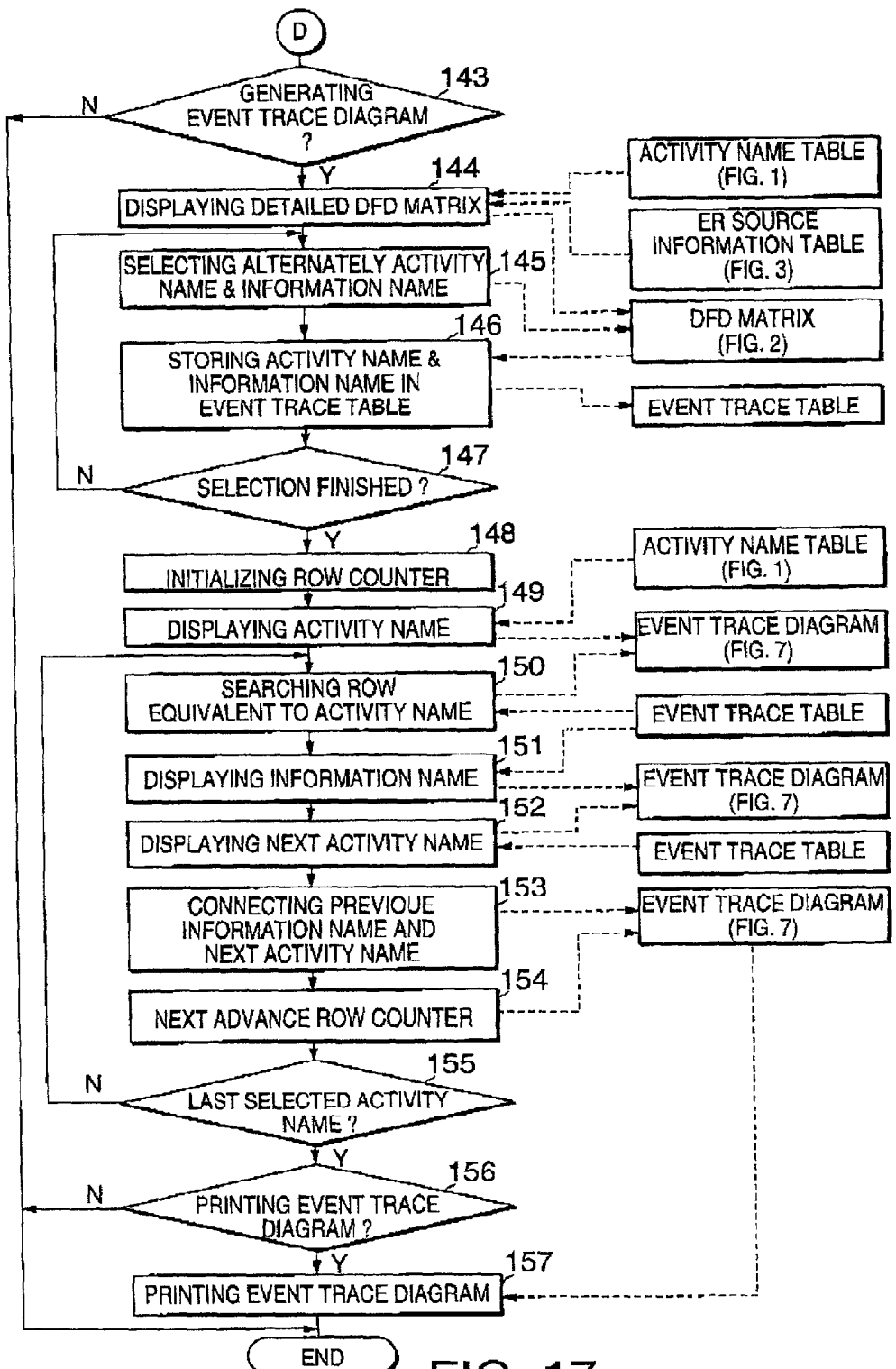
FIG. 17 is a flow chart illustrates further steps involved in the preferred process of defining information flows that are associated with operational activities according to the current invention.

Referring to FIG. 16, a flow chart illustrates further steps involved in the preferred process of defining information flows that are associated with operational activities according to the current invention. In particular, the steps are performed by the input/output information overview generation program 23. The following steps are either independent from or continuous with the previous steps as shown in FIG. 15. In addition, if they are continuous, the orders of the steps as shown in FIG. 15 and 16 are optionally reversed. In a step 135, it is confirmed with the user whether or not an input/output information overview is to be generated. If the input/output information overview is not generated, the preferred process skips steps 136 through 142 to proceed to a step 143 as shown in FIG. 17. On the other hand, if the input/output information overview is generated, the information provider activity name in the first column 401, the information name in the second column 402 and the information consumer activity name in the third column 403 of the ER source information table are respectively copied into the first column 701, the second column 702 and the third column 703 of the service information design table in in the service information design input/output information overview table storage file 21 and are outputted to the input/output unit 2 in a step 136. In the above duplication, the information for the activity names in the first column 701 in the service information table is placed in the vertical direction according to the sequence as indicated by the classification key in the second column 302 of the activity name table in the step 136.

Still referring to FIG. 16, in a step 137, it is confirmed with the user whether or not the user refers to the service function design table as shown in FIG. 5. If the service function design table does not yet exist or the user does not wish to refer to it, the preferred process proceeds to a step 140. On the other hand, if the service function design table is to be referred, a combination of the first, second and third columns 701, 702, 703 is selected in a step 138. The selected combination is searched in the first, second and third columns 601, 602, 603 in the service function design table, and the searched results are displayed in a step 139. The above reference on the information allows the user to consider functional systematization factors. Subsequently, the preferred process returns to the step 136, where the service function design table is again displayed and to the step 137, where the user is asked whether or not the service function design table needs to be referred. If there is no need for the reference, in a step 140, the input/output unit 2 reads the systematization factors, the key items and the input items from the fourth, fifth and sixth columns 704, 705 and 706 of the service information design table and stores them in an input/output information overview table in the service information design input/output information overview table storage file 21. In a step 141, the user is asked whether or not the input/output information overview is to be printed. If the input/output information overview is to be printed, the input/output information overview is outputted to the printer 5 in a step 142. On the other hand, if the input/output information overview is not printed, the preferred process proceeds to the step 143 as shown in FIG. 17.

Referring to FIG. 17, a flow chart illustrates further steps involved in the preferred process of defining information flows that are associated with operational activities according to the current invention. In particular, the steps are performed by the event trace diagram generation program 29. The following steps are either independent from or continuous with the previous steps as shown in FIG. 16. In a step 143, it is confirmed with a user whether or not an event trace chart is generated. If the event trace chart is not generated, the preferred process skips steps 144 through 157 and terminates. On the other hand, if the event trace is to be generated, the DFD matrix as shown in FIG. 2 is displayed based upon the activity name table and the ER source information table in a step 144. The activity names and the information names are alternatively sequentially selected from the DFD matrix according to the service operation. The above selection starts with an activity name and ends with another activity name in a step 145. The selected activity names and information names are stored in the event trace table in a step 146. In a step 147, it is confirmed whether or not the user has finished selecting the activity names and the information names. If it is determined that the selection has not completed in the step 147, the preferred process returns to the step 145. On the other hand, if it is determined that the selection has completed in the step 147, the line counter as indicated in the counter box 801 of the event trace is initialized in a step 148. In a step 149, the activity names in the first column 301 in the activity name table are expanded as shown in FIG. 7 from the left to the right in the activity name row 802 in the event trace chart according to the ascending sequence specifies by the classification key in the second column of the activity name table. One of the activity names is read from the event trace table for the event trace diagram, and the activity name is placed in the event record column 803 in a step 150. The same activity name is searched in the activity name row 802 in the step 150. In a step 151, the next information name after the current activity name is displayed in the event record column 803 that corresponds to the line counter box 801 and the row that corresponds to the activity name row 802 in the searched event trace table. Subsequently, the next activity name is read from the event trace table and is stored in the event record column 803 in the event trace diagram as shown in FIG. 7 in a step 152. The information name in the corresponding row of the activity name row 802 is connected to the current activity name in the event record column 803 by a line in a step 153. The line counter is incremented in a step 154. It is confirmed with the user whether or not the selected activity name is the last one in the event trace table in a step 155. If it is determined that the activity name is not the last one, the preferred process returns to the step 150. On the other hand, if it is determined that the activity name is the last one, the user is asked whether or not the event trace diagram is to be printed in a step 156. If the user wishes to print the event trace diagram, the event trace diagram as shown in FIG. 7 is outputted to the printer 5. On the other hand, if the user wishes not to print the event trace diagram, the preferred process ends.

The above described preferred processes and preferred embodiments enable the new service design process to be automated or standardized. The new service design process is shortened. While the clients befit from the short design period, the designers also benefit from the reduced design steps. Furthermore, since the design process is electronically cumulative, the know-how is also cumulated by sharing the common knowledge as well as improves the internal efficiency by transmitting the design information.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of designing an information flow process, comprising the steps of:
   determining a predetermined set of activity names in a predetermined sequence, the activity names respectively representing certain service operations;
   displaying the activity names as information provider activity names and information consumer activity names according to the predetermined sequence in a predetermined data flow definition (DFD) matrix format;
   specifying an information name, one of the information provider activity names and a corresponding one of the information consumer activity names, the information name at a position in the predetermined DFD matrix format representing data to be transmitted from the information provider activity name to the information consumer activity name;
   storing the relations among the information provider activity names, the information names and the information consumer activity names in an entity relation (ER) source information file;
   further determining associated detailed activities of a selected one of the activity names;
   updating the predetermined DFD matrix format based upon the associated detailed activities for displaying the activity names; and
   storing the activity names with the associated detailed activities in the ER source information file.

2. The method of designing an information flow process according to claim 1 further comprising additional steps of:
   modifying the activity names; and
   updating said displaying of the activity names in the predetermined DFD matrix format; and
   storing the modified activity names in the ER source information file.

3. The method of designing an information flow process according to claim 1 further comprising additional steps of:
   modifying the predetermined sequence for the activity names; and
   updating said displaying the activity names in the predetermined DFD matrix format according to the modified predetermined sequence; and
   storing the modified predetermined sequence of the activity names in the ER source information file.

4. The method of designing an information flow process according to claim 1 further comprising additional steps of:
   modifying the information names; and
   updating said displaying of the information names in the predetermined DFD matrix format; and
   storing the modified information names in the ER source information file.

5. The method of designing an information flow process according to claim 1 further comprising additional steps of:
   modifying the positions of the information names; and
   updating said displaying the information names in the predetermined DFD matrix format at the modified positions; and
   storing the modified positions of the information names in the ER source information file.

6. The method of designing an information flow process according to claim 1 further comprising additional steps of:
   further determining associated detailed activities of a selected one of the activity names;
   updating said displaying the activity names in the predetermined DFD matrix format based upon the associated detailed activities; and
   storing the activity names with the associated detailed activities in the ER source information file.

7. The method of designing an information flow process according to claim 6 wherein said further determining step additionally includes the steps of:
   preparing a structure data flow (SDF) input screen based upon the ER source information file; and
   receiving user input data for the associated detailed activities via the SDF input screen.

8. The method of designing an information flow process according to claim 7 wherein the SDF input screen displays an information provider activity name, an input information name, a detailed activity name, an output information name and an information consumer activity name.

9. The method of designing an information flow process according to claim 1 further comprising additional steps of:
   displaying a service function design table based upon information from the ER source information file, the service function design table allowing a user to define a new service function;
   receiving user input data at least for systematization factors; and
   storing the systematization factors and the information in the service function design table as a new function description.

10. The method of designing an information flow process according to claim 9 wherein the user input data includes activity contents and subjects.

11. The method of designing an information flow process according to claim 9 further comprising an additional step of printing the new function description.

12. The method of designing an information flow process according to claim 1 further comprising additional steps of:
    displaying a service information design table based upon information from the ER source information file, the service information design table allowing a user to define new service information;
    receiving user input data at least for systematization factors; and
    storing the systematization factors and the information in the service information design table as an input/output information overview.

13. The method of designing an information flow process according to claim 12 wherein the user input data includes activity contents and subjects.

14. The method of designing an information flow process according to claim 12 further comprising an additional step of printing the input/output information overview.

15. The method of designing an information flow process according to claim 1 further comprising additional steps of:

selecting sequential pairs of the activity names and the information names from the DFD matrix;

storing the sequential pairs of the activity names and the information names into an event trace table;

reading one of the activity names from the event trace table;

displaying the one of the activity names in an event record column in an event trace diagram;

reading a corresponding one of the information names from the event trace; and displaying the corresponding one of the information names in a row that corresponds to the one of the activity names in the event record column.

16. The method of designing an information flow process according to claim 15 further comprising an additional step of printing the event trace diagram.

17. A medium storing a computer program for designing an information flow process, the computer program performing the tasks of:

determining a predetermined set of activity names in a predetermined sequence, the activity names respectively representing certain service operations;

displaying the activity names as information provider activity names and information consumer activity names according to the predetermined sequence in a predetermined data flow definition (DFD) matrix format;

specifying an information name, one of the information provider activity names and a corresponding one of the information consumer activity names, the information name at a position in the predetermined DFD matrix format representing data to be transmitted from the information provider activity name to the information consumer activity name;

storing the relations among the information provider activity names, the information names and the information consumer activity names in an entity relation (ER) source information file;

receiving additional user input data for selecting sequential pairs of the activity names and the information names from the DFD matrix;

storing the sequential pairs of the activity names and the information names into an event trace table;

reading one of the activity names from the event trace table;

displaying the one of the activity names in an event record column in an event trace diagram;

reading a corresponding one of the information names from the event trace; and displaying the corresponding one of the information names in a row that corresponds to the one of the activity names in the event record column.

18. The medium storing a computer program for designing an information flow process according to claim 17 further performing additional tasks of:

modifying the activity names; and updating said displaying of the activity names in the predetermined DFD matrix format; and storing the modified activity names in the ER source information file.

19. The medium storing a computer program for designing an information flow process according to claim 17 further performing additional tasks of:

modifying the predetermined sequence for the activity names; and updating said displaying the activity names in the predetermined DFD matrix format according to the modified predetermined sequence; and storing the modified predetermined sequence of the activity names in the ER source information file.

20. The medium storing a computer program for designing an information flow process according to claim 17 further performing additional tasks of:

modifying the information names; and updating said displaying of the information names in the predetermined DFD matrix format; and storing the modified information names in the ER source information file.

21. The medium storing a computer program for designing an information flow process according to claim 17 further performing additional tasks of:

modifying the positions of the information names; and updating said displaying the information names in the predetermined DFD matrix format at the modified positions; and storing the modified positions of the information names in the ER source information file.

22. The medium storing a computer program for designing an information flow process according to claim 17 further performing additional tasks of:

further determining associated detailed activities of a selected one of the activity names;

updating said displaying the activity names in the predetermined DFD matrix format based upon the associated detailed activities; and storing the activity names with the associated detailed activities in the ER source information file.

23. The medium storing a computer program for designing an information flow process according to claim 22 wherein said further determining task additionally includes the tasks of:

preparing a structure data flow (SDF) input screen based upon the ER source information file; and receiving user input data for the associated detailed activities via the SDF input screen.

24. The medium storing a computer program for designing an information flow process according to claim 23 wherein the SDF input screen displays an information provider activity name, an input information name, a detailed activity name, an output information name and an information consumer activity name.

25. The medium storing a computer program for designing an information flow process according to claim 17 further performing additional tasks of:

displaying a service function design table based upon information from the ER source information file, the service function design table allowing a user to define a new service function;

receiving user input data at least for systematization factors; and storing the systematization factors and the information in the service function design table as a new function description.

26. The medium storing a computer program for designing an information flow process according to claim 25 wherein the user input data includes activity contents and subjects.

27. The medium storing a computer program for designing an information flow process according to claim 25 further comprising an additional task of printing the new function description.

28. The medium storing a computer program for designing an information flow process according to claim 17 further comprising additional tasks of:
- displaying a service information design table based upon information from the ER source information file, the service information design table allowing a user to define new service information;
- receiving user input data at least for systematization factors; and
- storing the systematization factors and the information in the service information design table as an input/output information overview.

29. The medium storing a computer program for designing an information flow process according to claim 28 wherein the user input data includes activity contents and subjects.

30. The medium storing a computer program for designing an information flow process according to claim 28 further comprising an additional step of printing the input/output information overview.

31. The medium storing a computer program for designing an information flow process according to claim 17 further comprising additional tasks of:
- selecting sequential pairs of the activity names and the information names from the DFD matrix;
- storing the sequential pairs of the activity names and the information names into an event trace table;
- reading one of the activity names from the event trace table;
- displaying the one of the activity names in an event record column in an event trace diagram;
- reading a corresponding one of the information names from the event trace; and
- displaying the corresponding one of the information names in a row that corresponds to the one of the activity names in the event record column.

32. The medium storing a computer program for designing an information flow process according to claim 31 further comprising an additional task of printing the event trace diagram.

* * * * *